UNITED STATES PATENT OFFICE.

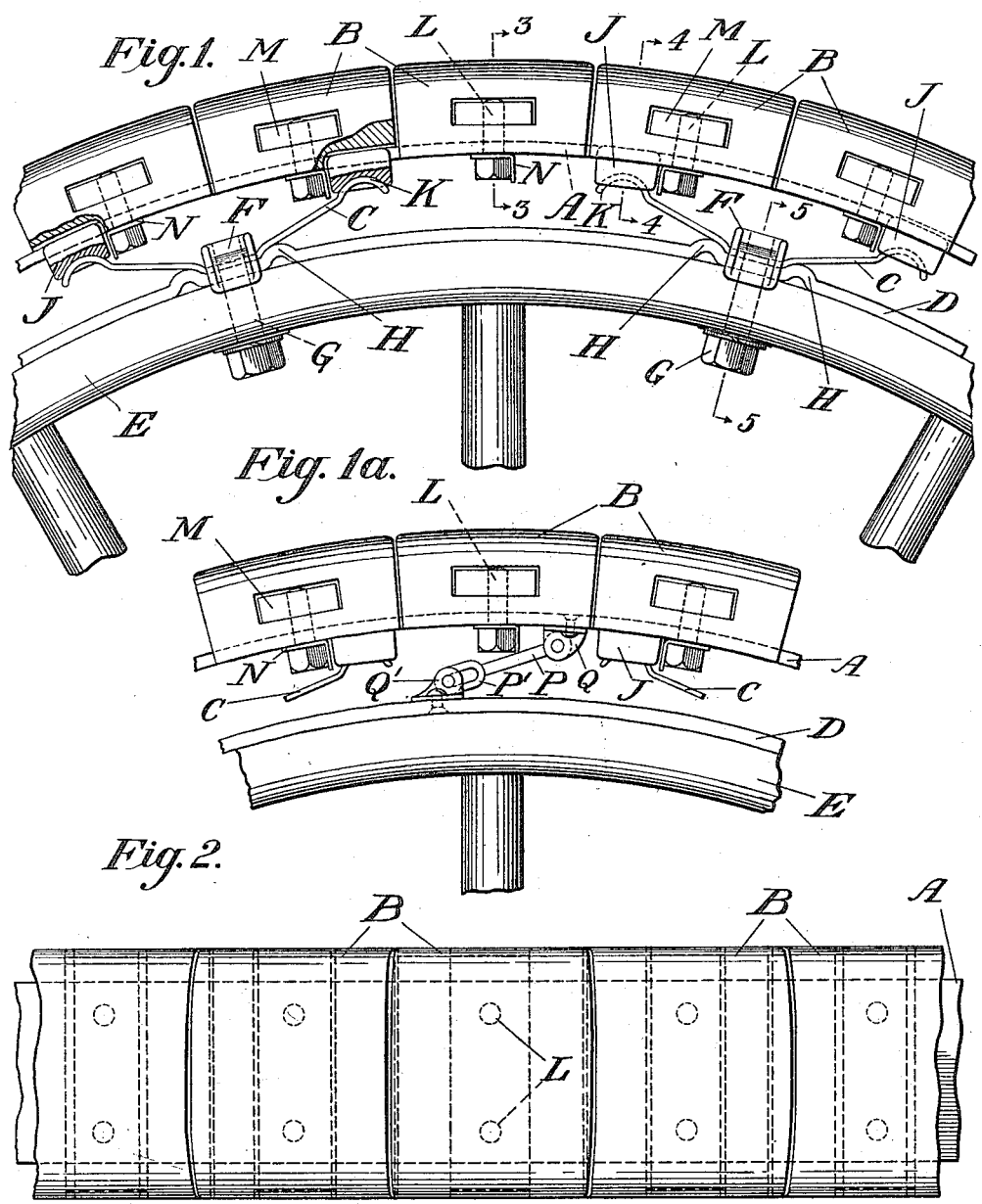

CHARLES WALTER GUTTZEIT, OF NEW YORK, N. Y.

TIRE.

1,214,155.　　　　　Specification of Letters Patent.　　Patented Jan. 30, 1917.

Application filed October 4, 1912. Serial No. 723,841.

*To all whom it may concern:*

Be it known that I, CHARLES WALTER GUTTZEIT, a citizen of the United States, and resident of Manhattan, in the city, county, and State of New York, have invented certain new and useful Improvements in Tires, of which the following is a specification, reference being had to the accompanying drawings, forming a part hereof.

My invention relates to tires, and more particularly such as would be used on automobiles and especially heavy automobiles.

My invention has particular reference to a construction of tires affording sufficient resiliency at the rim of the wheel to absorb shocks and jars without the disadvantages of constructions heretofore used. It also involves the construction of such a tire affording the necessary strength and resistance and the other objects which will hereinafter appear, and be of simple construction, economical to manufacture and permit ready replacement of parts in case of wear or breakage. In its effectiveness it is intended to give the required resiliency without pneumatic or solid cushion to absorb shock on the tread.

Other advantages will appear from detailed description of my invention as hereinafter set forth in connection with the drawings forming a part hereof.

Figure 3:
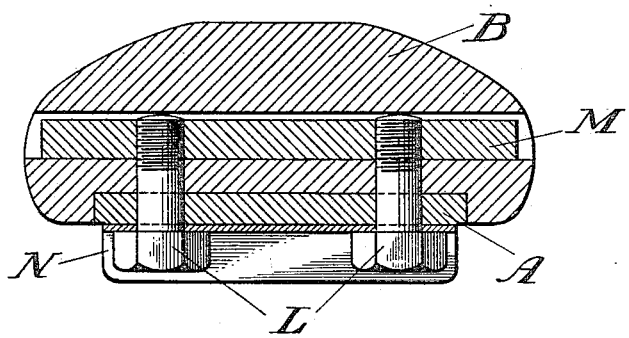
Figure 4:
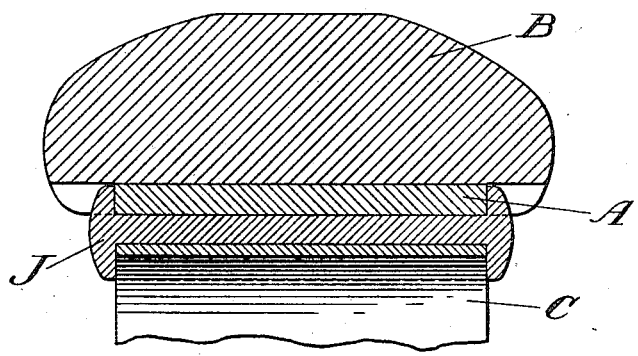
Figure 5:
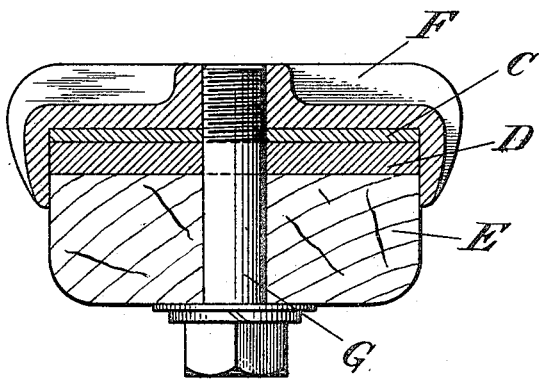

Figure 1 is a side view of a portion of the tire. Fig. 1ª is a smaller portion of the tire showing additional detail. Fig. 2 is a plan view of the tread of the tire. Fig. 3 is a section at 3—3 in Fig. 1. Fig. 4 is a section at 4—4 in Fig. 1. Fig. 5 is a section at 5—5 in Fig. 1.

In the figures, A is a continuous flexible rim which would usually be of metal; B—B are sectional blocks constituting the tread; C—C are springs; D is a felly-band; E a felly; F—F are spring clips; G—G are bolts securing the spring clips; H—H are ribs or ridges in the felly-band; J—J are spring wearing blocks; K—K are crimped ends of the spring C; L—L are lag bolts engaging the plates M to hold the blocks of the flexible rim A; N—N are bent lock washers constituting an abutment for the wearing blocks as well; P is a link attached to ears Q on the flexible-band A, and Q' on the felly-band with a slot P' at the end of the link P.

The flexible-band A is produced of material such as will permit its bending at points in its circumference where the tire rests on the ground, and of such flexibility and strength as would be obtained as, for instance, with vanadium steel of high quality, as to give strength and permit a bending which cannot be obtained in tire structures heretofore suggested. To permit the bending, the tread of the tire is made of separated blocks B attached in any usual manner, as by bolts L, engaging plates M in the blocks. When secured in position on the flexible-band by these lag bolts, the head of the bolt is locked by a strip extending to the two bolts for each block, as shown in Fig. 3, and the locked strip is bent on one side so as to form a rib inwardly projecting radially from the inner side of the flexible rim A. The tire as so constructed is suspended concentrically around the felly of the wheel in a manner to permit the flexibility at any point.

The felly E has the usual felly-band D, but this has at intervals about its circumference transverse recesses which may be formed as shown by crimping the felly-band at H—H, although there may be added strips in the band or the band may be rolled so as to leave ribs like H with an outer curved surface.

The springs C are substantially the width of the felly and at their middle rest in the recesses between two of the ribs H, and are held there by the spring clip F, which, as shown in Fig. 5, is drawn down on the spring C by means of bolt G. Supported in this manner, when the springs are depressed they bend close to the spring clip F over the ribs H, and as it progressively engages the ribs H the bending down of the spring moves outwardly from the spring center so that the bending, which is constant in the operation of my tire, is not concentrated at one point of the spring.

At each end of the spring there is a curved portion K which fits into a recess on the underside of the wearing block J. The recess in the block does not extend from end to end, but stops at a flange at each end of the block J, so that the end K of the spring engages laterally the end flange of the block J, preventing movement of the block transversely of the tire. The outer side of the block J has flanges projecting outwardly and engaging the lateral edges of the flexible-band A, so as to prevent the band from lateral movement. With the center of the springs C securely clamped to the felly-band and felly, it will thereby be seen that lateral movement of the blocks J, and through them lateral movement of the flexible-band A and the entire tire, is prevented.

Circumferential movement is prevented by the engagement of any one or more of the blocks J with the transverse rib of the bolt lock N. The blocks B of the tread are as shown arranged in pairs, each block of the pair having a block J, located beneath it. One of the blocks J abuts against the transverse rib of the bolt lock N, on the forward side of the lag bolts L, and the adjoining or companion block J on the rearward side of the said bolts, thus preventing movement of the rim A circumferentially no matter what the direction of movement of the wheel, whether forward or backward. Between each pair of blocks B, fitted with blocks J is arranged a block B unprovided with a block J. That circumferential movement of the entire structure may be further prevented, I may make use of a plurality of links as illustrated for example in Fig. 1ª, in which P, the link proper, is pivoted to an ear Q on the under side of the flexible band A, adjacent each intermediate block B between the pairs of the same. The other end of the link P has a slot P' which engages the pin and ear Q' suitably attached to the felly band.

From the above it will be seen that the flexing of the band A locally depresses it toward the felly and compresses one or more of the springs locally, and while compressing the sliding blocks J move on the inner side of the flexible-band A, insuring free movement and concentrating the wear on these blocks, which are made of suitable material to withstand it. The constant action of the tire in flexing in actual use thereby results in movement of only such engaging parts as are particularly adapted, not alone to stand the wear, but most admirably suited to take transverse strains and the load incident to operation. The member which might be more likely to require replacement through breakage is the spring C, and this is so constructed and so secured as to permit its quick removal and replacement, by detaching the clip F, by loosening the bolt G, and then bending down one end of the spring and sliding out the block J, after which the other end may be readily removed and the entire spring taken out laterally, and by reverse operation a new spring substituted.

By my construction it will be seen that local flexing of the tire is accommodated by having a very flexible-band, such as A, but with this the spring supporting means is such as to permit local flexing without interference with the proper supporting of the tire at all other points in the circumference, and thereby distinguishing it from previous constructions in which the yielding at one side of the tire was only possible by an outward yielding at the other side of the tire, or, in other words, the movement of the felly and rim into varying positions of eccentricity while each preserves its circular form. It might be further explained by stating that the tread of my tire may be dented locally, whereas other attempts heretofore to use springs between the tread and the felly of a wheel, have only been with the object of suspending the wheel, felly and spokes floating within a permanently circular outer rim. Such prior attempts resulted in the entire outer tread and rim being moved when going over an obstruction, whereas in my construction a local distortion of the rim is accommodated to absorb the jar and the inequality of the road as completely as does the tread of a pneumatic.

The blocks B attached to the rim A may be of rubber, wood or other material, and are capable of ready replacement. When of solid material, such as wood, they would be suitably spaced to permit local flexing of the rim E, the adjacent blocks engaging each other.

While the interengaging parts, such as the rim and the sliding block J, are suitably accommodated, it will also be seen that the semi-cylindrical form of the crimp K in the end of the spring C engages a similarly formed surface in the inner side of the block J, thereby permitting relative movement as the spring is depressed and the upper side of the block J remains in flat contact with the inner side of the rim A. I may provide suitable clips to prevent the block J from disengaging from the rim and the end of the spring C, or from either of them, by passing a wire through a hole in the end of flange J, or in other ways.

It will also be seen that having a continuous rim A, the strains due to traction are admirably accommodated, as well as all the other stresses and strains in its use, which would not be the case if the rim were made in sections. Having the springs secured to the felly and having them broad, practically coextensive with the breadth of the felly, gives a rigid support to the springs and insures a proper supporting of the rim and resistance to transverse strains. The stiff rim A insures a proper support of the tread and the distribution of strains to the springs, which would not be the case if the entire rim were made in articulated sections or sections bending as would rubber or leather.

While I have shown and described a particular form, my invention is capable of various modifications without departing from the spirit of my invention, but

What I claim and desire to secure by Letters Patent is:

1. In a wheel, a tire comprising a continuous flexible metal rim, a plurality of blocks on said rim constituting a segmental tread, said blocks arranged in pairs and having an additional block between adjacent pairs, a felly, springs between said felly and said rim secured to one of said members at its middle, bearing blocks between the ends of said spring and the other member, an inward projection on the flexible metal rim under each block, said bearing blocks of each spring being located on opposite sides of the said inward projections under each block in each pair.

2. In a wheel, a tire comprising a continuous flexible metal rim, tread blocks on said rim, means for securing said blocks which means include projections on the inner side of the rim, a felly, bearing blocks arranged between the felly and the rim and adapted to engage circumferentially the opposite sides of a plurality of said securing means on the inside of said rim, a plurality of springs of flat stock each having one of its ends engaging the bearing block and means for securing the middle of each spring against circumferential movement on the felly.

3. In a wheel, a tire comprising a continuous flexible metal rim, blocks on said rim constituting a segmental tread, an attaching plate associated with each of said blocks, bolts passing through the rim and respectively engaging said attaching plates, washer plates for each of said bolts, a lateral extension on said washer plate to lock the same against rotation to form an abutment, a felly, bearing blocks between the felly and the rim so arranged whereby said blocks bear against the extension of said washer plate, and springs engaging at their free ends the bearing blocks.

4. In an automobile tire, a flexible continuous rim, a suitably yielding segmental tread, flat springs positioned circumferentially within said rim and supporting it about a felly, bearing blocks between the springs and rim and holding the rim against circumferential movement, flanges on the bearing blocks engaging the edges of the rim, and a recess in the blocks to engage the ends of the springs to form a seat for the latter and prevent sidewise movement of the bearing blocks.

5. In an automobile tire, a rigid felly, a flexible rim surrounding said felly of a size affording a space between it and the felly to permit radial relative movement, detachable blocks secured at intervals to the said flexible rim to constitute the tread and prevent engagement of the rim with the ground, a plurality of springs between the rim and the felly, a clamp to secure each at its middle against circumferential movement with relation to the felly, bearing blocks engaging the outer end of each spring, lateral flanges on said bearing blocks whereby said bearing blocks are prevented from lateral displacement with relation to the rim, and flanges on the bearing blocks to engage the spring ends laterally, whereby the bearing blocks and coöperating parts afford the sole means for preventing lateral displacement of the rim with respect to the felly.

6. In a wheel, a tire comprising a continuous flexible metal rim, tread blocks on said rim, means for securing said tread blocks to said rim, a felly, bearing blocks arranged between the felly and the tread blocks and bearing against opposite sides of the means securing the tread blocks to the rim, springs of flat stock secured to the felly and engaging said bearing blocks.

7. In an automobile tire, a flexible rim, a tread consisting of a series of pairs of tread blocks secured to the rim, a felly, a plurality of springs each of which supports a pair of tread blocks, a tread block interposed between each of the pairs of tread blocks and connections between the felly and the rim at the position of the interposed tread block.

In testimony whereof, I have signed my name to this specification, in the presence of two subscrbing witnesses, this 2nd day of October 1912.

CHARLES WALTER GUTTZEIT.

Witnesses:
HERRMANN F. CUNTZ,
H. MUCHMORE.